US006560551B1

(12) United States Patent
Severson et al.

(10) Patent No.: US 6,560,551 B1
(45) Date of Patent: May 6, 2003

(54) LIQUID WATER CONTENT MEASUREMENT APPARATUS AND METHOD

(75) Inventors: John A. Severson, Eagan, MN (US); Kenneth J. Schram, Eden Prairie, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 18 days.

(21) Appl. No.: 09/641,298

(22) Filed: Aug. 18, 2000

(51) Int. Cl.[7] .............................................. G01F 17/00
(52) U.S. Cl. .............................. 702/54; 702/24; 702/3; 73/24.04; 73/170.26; 340/962; 340/582
(58) Field of Search ................................ 340/582, 962, 340/602; 702/54, 3, 24; 73/170.26, 24.01, 24.04, 29.01, 29.02, 335.02, 29.05

(56) References Cited

U.S. PATENT DOCUMENTS

| | | | | |
|---|---|---|---|---|
| 3,341,835 A | * | 9/1967 | Werner et al. | 340/582 |
| 4,441,363 A | * | 4/1984 | Hill et al. | 340/582 |
| 4,570,881 A | | 2/1986 | Lustenberger | 244/134 |
| 5,134,380 A | * | 7/1992 | Jonas | 324/663 |
| 5,474,261 A | * | 12/1995 | Stolarczyk et al. | 244/134 F |
| 5,932,806 A | | 8/1999 | Rose et al. | 73/599 |
| 6,347,767 B1 | * | 2/2002 | Holmen | 244/134 F |

FOREIGN PATENT DOCUMENTS

DE    0600357 A1    11/1993

OTHER PUBLICATIONS

Smart ice detection systems based on resonant piezoelectric transducers, Shuvo Roy, Alain Izad, Russell G. DeAnna, Mehran Mehregany, Sep. 1998, 243–250.

FAA Urges Changes in R22, R44 Fleet, Edward H. Phillips/Washington, Aviation Week & Space Technology, vol. 142, No. 24, (1995), p. 59.

Shorter Contributions, The heat economy of a rimed cylinder, pp. 663–666 by F. H. Ludlam.

Equilibrium Temperature of an Unheated Icing Surface as a Function of Air Speed, pp. 29–42, by Bernard L. Messinger.

* cited by examiner

Primary Examiner—John Barlow
Assistant Examiner—Stephen J. Cherry
(74) Attorney, Agent, or Firm—Westman, Champlin & Kelly, P.A.

(57) ABSTRACT

Ice accretion on a probe is detected by determining the change of frequency of a vibrating type ice detector or sensor as ice starts to build up. The rate of change of frequency is determined and is combined with parameters including air velocity and air temperature for providing a signal that indicates liquid water content in the airflow as well as ice accretion on the ice detector.

12 Claims, 5 Drawing Sheets

LIQUID WATER CONTENT MEASUREMENT APPARATUS AND METHOD

BACKGROUND OF THE INVENTION

The present invention relates to an apparatus and method for determining with accuracy the liquid water content of ambient air, particularly in relation to air flows across air vehicles or other structures. The accurate and timely measurement of liquid water content (LWC) permits prompt signalling for activating deicing systems, and also permits sensing atmospheric conditions for reporting or research purposes.

Unheated bodies exposed to airflow laden with supercooled water droplets will typically accrete ice as the droplets impact the body and freeze. Icing is particularly a problem with air vehicles. Determining when ice is starting to form or predicting when it will form is important in aircraft management of deicing equipment including heaters, which can consume huge amounts of power. When the air temperature is cold enough, 100% of the droplets carried in the airflow will freeze. If the temperature warms or airflow is increased, the energy balance relationship is altered. A critical liquid water content is reached where not all of the impinging supercooled water droplets freeze. This critical liquid water content is defined as the Ludlam Limit. The Ludlam Limit is described in an article by F. H. Ludlam entitled *The Heat Economy of a Rimed Cylinder*. Quart. J. Roy. Met. Soc., Vol. 77, 1951, pp. 663–666. Additional descriptions of the problem are in articles by B. L. Messinger, entitled *Equilibrium Temperature of an Unheated Icing Surface as a Function of Air Speed, Journal of the Aeronautical Sciences*, January 1953, and a further article entitled *An Appraisal of The Single Rotating Cylinder Method of Liquid Water Content Measurement*, by J. R. Stallbrass, Report—Low Temperature Laboratory No. LTR-LT-92, National Research Council, Canada, 1978.

It has been shown that if the LWC increases above the Ludlam Limit, the accretion characteristics in theory remain unchanged, because excess water simply blows off or runs off, rather than freezing. Thus, present systems for determining liquid water content based on ice accretion suffer degraded accuracy above the Ludlam Limit. The Ludlam Limit for a given temperature and airflow is the liquid water content above which not all of the water freezes on impact with an accreting surface.

Accretion based ice detectors are frequently designed with probes that permit ice build up to a set mass, perhaps taking 30 to 60 seconds depending on conditions, at which time the presence of ice is enunciated or indicated, and a probe heater energized to melt the ice. Such ice detectors are well known in the art, and many depend upon a vibrating sensor or probe, with a frequency sensitive circuit set to determine frequency changes caused by ice accreting on the detector probe.

Liquid water content can be roughly determined by monitoring a signal proportional to the probe icing rate, which again can be determined with existing circuitry, but accuracy degrades rapidly if the liquid water content is above the Ludlam Limit, because a portion of the impinging water never freezes. In such cases the actual liquid water content will be under reported, with the Ludlam Limit liquid water content being the maximum that will be reported. Even though the droplet cloud may contain additional liquid water, there will be no indication from such an ice detector that there is additional liquid water in the air flow. Thus, the prior art devices will not discern the actual liquid water content when the Ludlam Limit has been exceeded.

SUMMARY OF THE INVENTION

The present invention relates to determining the liquid water content in an airflow, in particular, air flow past an air data sensing probe on an air vehicle. The amount of the liquid water in the airflow is determined even for liquid water content levels above the Ludlam Limit. The present invention senses ice growth rate on a vibrating probe type ice detector. The ice growth rate is predictably variable over an accretion cycle based upon the incremental rate of change of the vibrating probe's frequency throughout the sensing cycle. The rate of change of probe vibration frequency (df/dt) throughout the ice accretion cycle is determined. Further, the rate of frequency change (df/dt) characteristics are demonstrated to be a predictable function of liquid water, content, even above the Ludlam Limit, meaning that liquid water content can be determined at the higher liquid water content level.

The rate of change of probe vibrating frequency is determined for all or a portion of the ice accretion phase of the probe operating cycle, because it has been determined that this rate of frequency change (df/dt) is a function of liquid water content at that time.

In order to measure liquid water content with the present invention, the air speed and the temperature of the ambient air must be known. These basic parameters are readily available from an air data computer, using outside instrumentation, such as a pitot tube or a pitot-static tube, and a temperature sensor, such as a total air temperature sensor. The known liquid water content at a particular known air speed, temperature and rate of change of the vibration frequency of a vibrating probe ice detector are determined and combined in a look up table. The values can be determined by actual icing wind tunnel tests, or test results can be used to derive an algorithm that provides liquid water content when the three variables, air flow rate (or air speed), temperature and rate of change of frequency of vibration caused by ice accretion are known. Although a frequency rate of change is described herein, the rate of change of other signals sensitive to ice accretion could be used. A signal based on the rate of change of ice accretion (but not merely the amount of ice accretion) is a key to proper results.

The overall accretion time has been found to decrease with increasing liquid water content in most cases, but this is not assured. This invention is dependent on ice accretion, and will approach some limit of usefulness when operating conditions are such that little or no ice accretes on the probe. This may occur under conditions of warmer air temperature and high aerodynamic heating, for example.

DETAILED DESCRIPTION OF THE EXEMPLARY EMBODIMENTS

Figure 1:
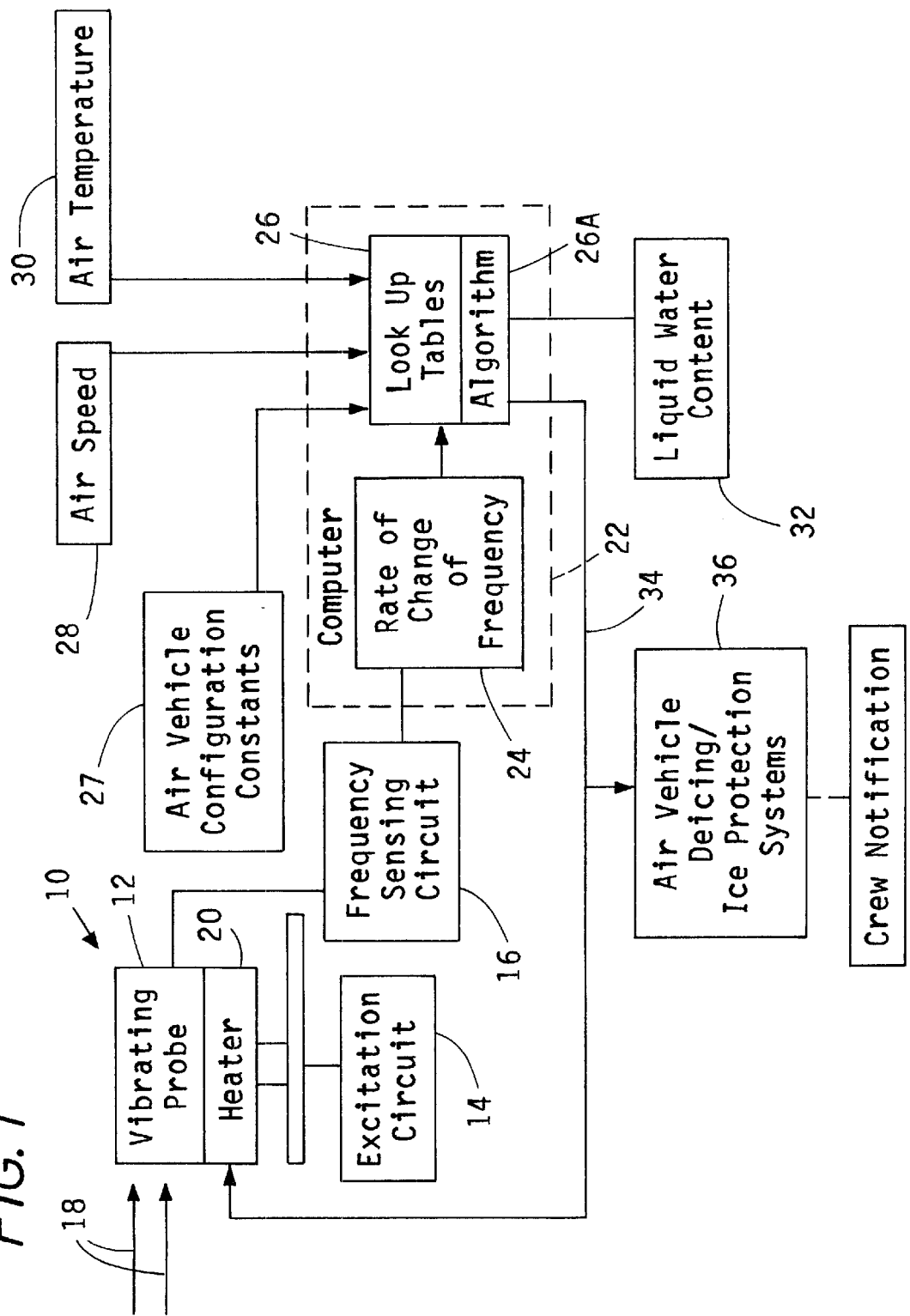
FIG. 1 is a schematic block diagram of the apparatus used for determining liquid water content in response to rate of change of frequency caused by commencement of ice accretion on a vibrating probe and for controlling probe heater deicers.

FIG. 1 illustrates a typical set up for utilization of an existing ice detecting probe and the circuitry for determining liquid water content even above the Ludlam Limit. The apparatus 10 includes a vibrating ice collecting or detector probe 12, such as that sold by Rosemount Aerospace Inc., Burnsville, Minn., as its Model 0871 series. An early vibrating, resonant frequency ice detector probe is shown in U.S. Pat. No. 3,341,835 to F. D. Werner et al.

In the present invention, an excitation circuit 14 is used for providing an excitation signal to vibrate the vibrating probe at a resonant frequency. A known frequency sensing circuit 16 is utilized for determining changes of frequency of the vibrating ice detector probe in a conventional manner. The change in frequency is caused by ice accretion on the surface of the ice detector probe. This design is recognized to be insensitive to probe contaminants such as dirt and insects. The rate of accretion of ice is reflected in the rate of change of frequency. The rate of ice accretion is directly related to the liquid water content of the air. The probe 12 is exposed to airflow as indicated by the arrows 18, and supercooled water droplets will impact and freeze on the probe 12 surface or previously accreted ice at surface temperatures below freezing. The signal 34 indicating ice formation can be used for turning on deicing equipment 36 or other ice protection systems for the air vehicle involved and/or notifying the crew of an icing condition. The signal 34 indicating ice formation can be tailored to the particular air vehicle and its level of tolerance for ice buildup, such that deicing equipment is activated in a timely manner, while nuisance activations are minimized.

The look up tables 26 or algorithm 26A are designed to determine an icing severity level. After a predetermined duration of exposure at a particular icing condition constituting an icing severity level, or an aggregate of conditions resulting in equivalent ice buildup or impact to the aircraft, the signal 34 is supplied. The signal may be supplied continually or on a periodic basis until the icing condition abates. The calculated df/dt value changes and provides the indication of ice formation, and when correlated to airspeed and temperature is used as the measured parameter for turning on deicing heaters and determining liquid water content. The heaters indicated at 20 that are associated with the ice detector probe, for removing the ice that has built up on the probe during the operational cycle, may also be activated with this signal. The advantage is that reset times may be faster than current practice of deicing the probe after a set mass of ice has accreted.

Figure 2:
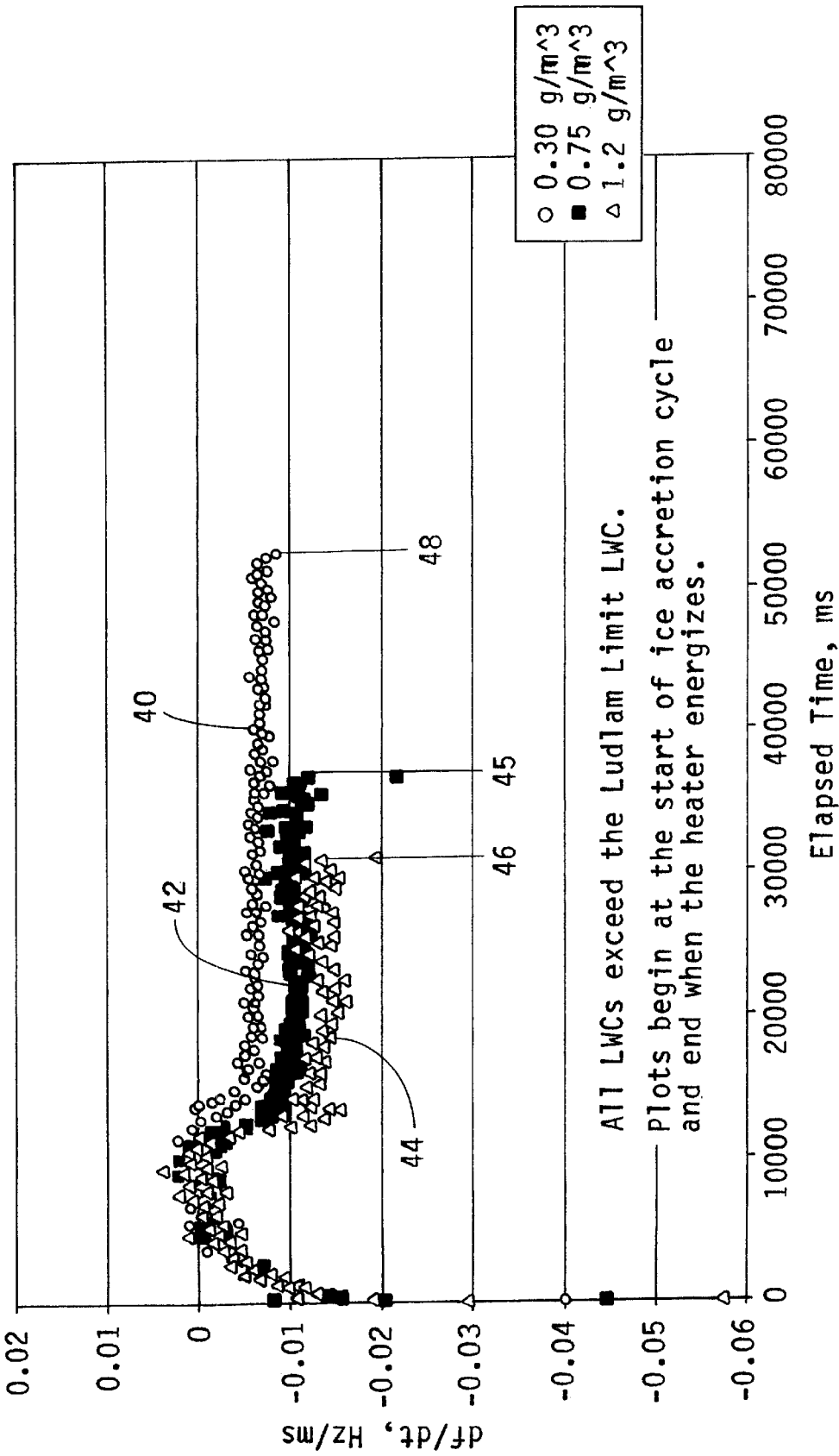
FIG. 2 is a plot of measured rate of change of frequency during ice accretion at −5° C. temperature, with a constant airspeed of 200 knots with airflows having three different, but known levels of liquid water content in the air flow.
Figure 3:
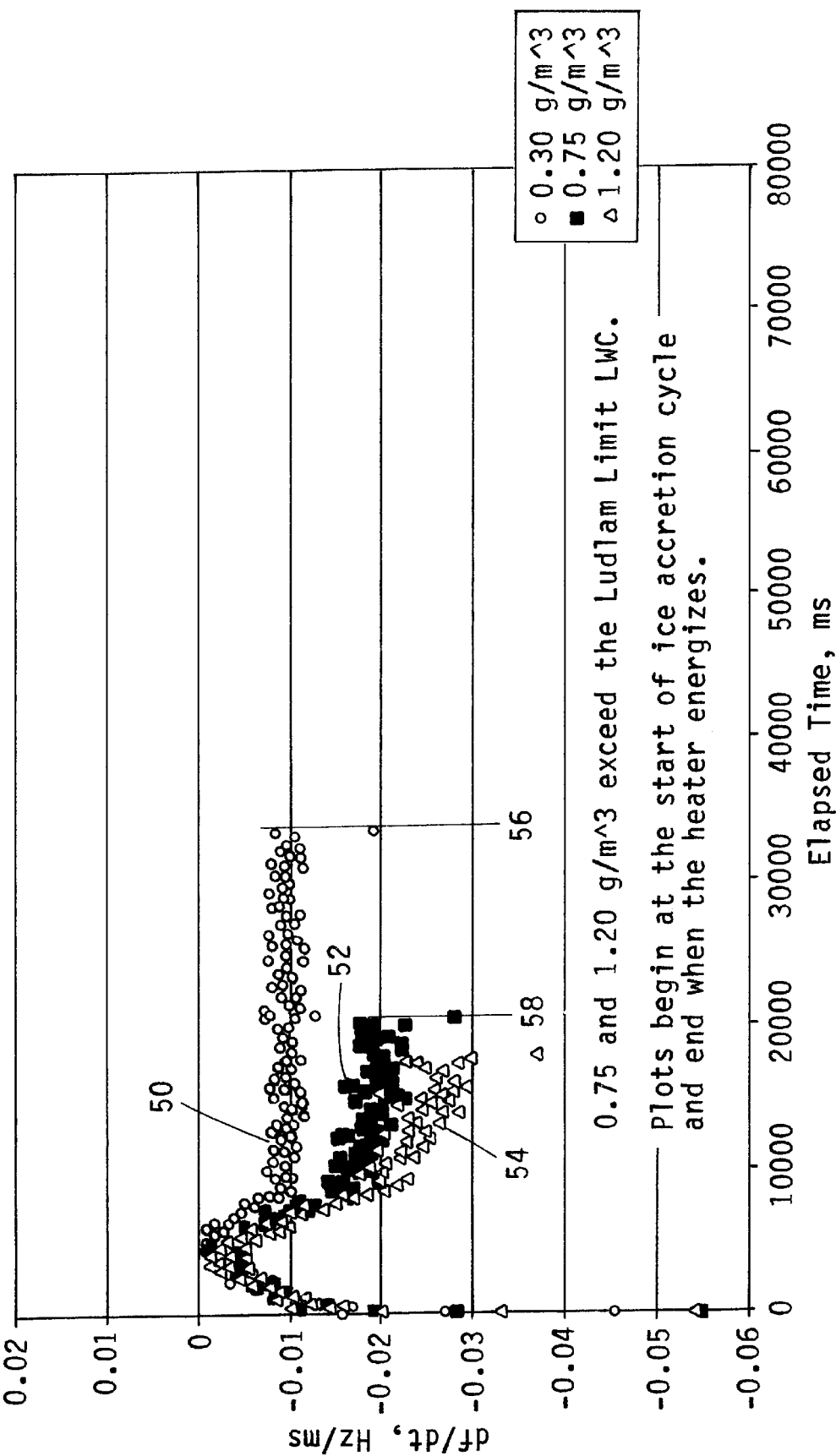
FIG. 3 is a plot similar to FIG. 2 with the indications taken at −10° C. and a constant air speed of 200 knots with the same liquid water content in the airflows.
Figure 4:
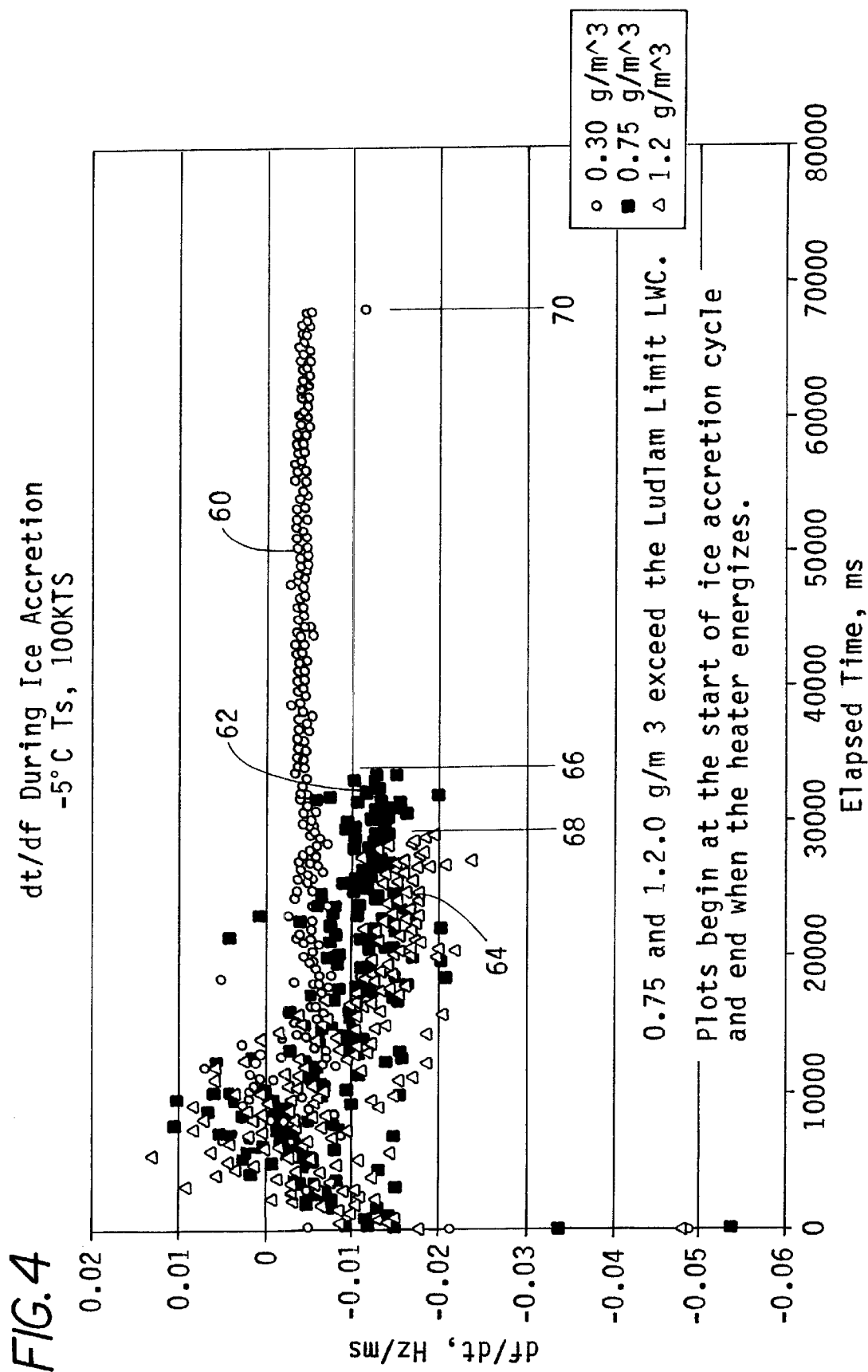
FIG. 4 is a plot of rate of change of frequency during ice accretion of a typical vibrating probe at −5° C. and a speed of 100 knots.

In the present invention, the frequency sensing circuit 16 provides an indication of the change of frequency of the probe 12, and this signal is provided to computer 22 that includes a time input to provide a rate of change of frequency determination section 24. The rate of change of frequency (df/dt) is a function of liquid water content, air temperature and airspeed and is determined in a matter of milliseconds during initial ice accretion, and updated continually until the deicing heaters are turned on. The heaters can be turned on at a selected time after an initial df/dt signal, or when df/dt reaches a selected value. The probe heaters remain on long enough to deice the probe after which the cycle repeats. The correlation of the frequency rate change signal to liquid water content can be provided in a look up table shown at 26, or by entering the parameters into an algorithm in memory section 26A of the computer 22. Based upon temperature and airspeed inputs, and the measured rate of change of frequency over all or a portion of the ice accretion cycle as shown in FIGS. 2, 3 and 4, the liquid water content measurement can be determined.

The look up tables or algorithm reflecting the measured plots include an input of the true air speed 28. For example, an input from a pitot tube, or other suitable air speed indicator, that determines the relative velocity of the airflow 18 past the vibrating probe 12 may be used. An additional input parameter is air temperature indicated at 30, which can be obtained from a known total air temperature sensor, or an ambient air temperature sensor, as an input to the look up table 26 or algorithm section 26A.

Air vehicle configuration constants, including for example the aircraft tolerance to ice build up can be an input, as indicated at 27. These factors can insure timely activation, while minimizing nuisance activation, of ice protection equipment, and also can insure a more correct liquid water content indication.

The known relationship of the liquid water content to the rate of change of frequency, air speed and air temperature, and if desired, aircraft configuration constants, then will provide a signal that is a direct, reliable indication of liquid water content as indicated at 32. This liquid water content information can be used for research or analysis of the ambient air. Additionally, the output of the look up table and computer 22 can be utilized for activating the probe heater 20, as shown by a signal along the line 34, and also can then be used for activating and turning on the air vehicle surface deicing heaters indicated at 36 and/or notifying the crew of an icing condition, which comprise one form of ice protection system.

Utilizing a vibrating type ice detector, and using known air temperature and airflow velocity, in one plot a temperature of −5° C., and an air velocity of 200 knots, the results at three different levels of liquid water content are plotted in FIG. 2. It can be seen that at the known liquid water content levels of 0.3, 0.75 and 1.2 grams per cubic meter, indicated by the plots 40, 42 and 44, respectively, the rate of change of resonant vibration frequency of the ice detector probe as ice accretes on the detector probe provides an indication of the liquid water content that can be identified quickly. The elapsed time is very short before distinct patterns emerge. For example, within 10,000 milliseconds a determination of the rate of change in frequency in Hertz per millisecond can be examined and determined from the plotted data points. At 20,000 milliseconds the data for each liquid water content merge and the plots are clearly defined. From commencement of accretion to about 5,000 milliseconds the data points run together and are somewhat scattered. The plots or curves are derived using air samples with a known liquid water content. All of the liquid water content samples used in plotting FIG. 2 have a liquid water content that is above the Ludlam Limit at the temperature and airflow rates disclosed.

The heaters for deicing the ice detector probe 12 are turned on at the ends of the plots in FIGS. 2, 3 and 4. For example, the probe heaters are turned on at the time represented by vertical lines 45 and 46 in FIG. 2 for the plots at 0.75 and 1.2 grams per cubic meter, and are turned on at the time shown by vertical line 48 for 0.3 grams per cubic meter. The heater turn on signal is given when the ice has built up on the probe to affect the frequency signal from the probe a desired amount.

Identifiable results are also achievable with a lower ambient air temperature, −10° C., as illustrated in FIG. 3, and at the same air velocity of 200 knots. The plots for 0.3, 0.75 and 1.25 grams per cubic meter are indicated at 50, 52 and, 54, respectively. The measured data points for each liquid water content merge closely together to define distinct identifiable plots of df/dt in less than 10,000 milliseconds to provide an indication of the liquid water content, regardless of whether the content is above the Ludlam Limit. In FIG. 3, (−10° C. and 200 knots) only 0.75 and 1.2 g/m$^3$ plots exceed the Ludlam Limit of liquid water content.

Again, the probe heaters are turned on where the plots end in FIG. 3, generally along a vertical line 58, for the plots where the liquid water content is above the Ludlam Limit, namely plots 52 and 54, and a vertical line 56 for the turning on of the deicing heater on the vibrating type deicer probe when the liquid water content is below the Ludlam Limit, namely 0.30 g/m$^3$.

FIG. 4 shows further plots of the rate of change of frequency in hertz per millisecond plotted against time, in milliseconds. In this case, the temperature is −5° C. and airspeed is 100 knots. While somewhat more scattered, the data points can be averaged so that the plots for the liquid water content of 0.30 g/m$^3$, is shown at 60. The 0.30 g/m$^3$ liquid water content is below the Ludlam Limit while the others are above the limit. The plot for 0.75 g/m$^3$ is indicated at 62, and the plot for a liquid water content of 1.20 g/m$^3$ is indicated at 64, these plots all show that the rate of change of frequency, df/dt provides sufficient information to indicate the liquid water content within about 15,000 milliseconds with reliability. Again, in this instance, the heaters are turned on at a time indicated by vertical lines 66 and 68 for the plots of 0.75 g/m$^3$ and 1.20 g/m$^3$, respectively, and the heaters are turned on for the plot for the 0.30 g/m$^3$ at the time line 70.

The rate of change of frequency df/dt, will provide information indicating the rate of ice accretion in each of the plots, even though the liquid water content may be above the Ludlam Limit. This can provide for early information to the crew of an icing condition and/or activation of the deicing heaters on the air vehicle to avoid any substantial build up of ice. Also, the information on liquid water content can be used for research and analysis because the present invention gives a reliable indication of liquid water content at substantially all ranges of liquid water content.

Figure 5:
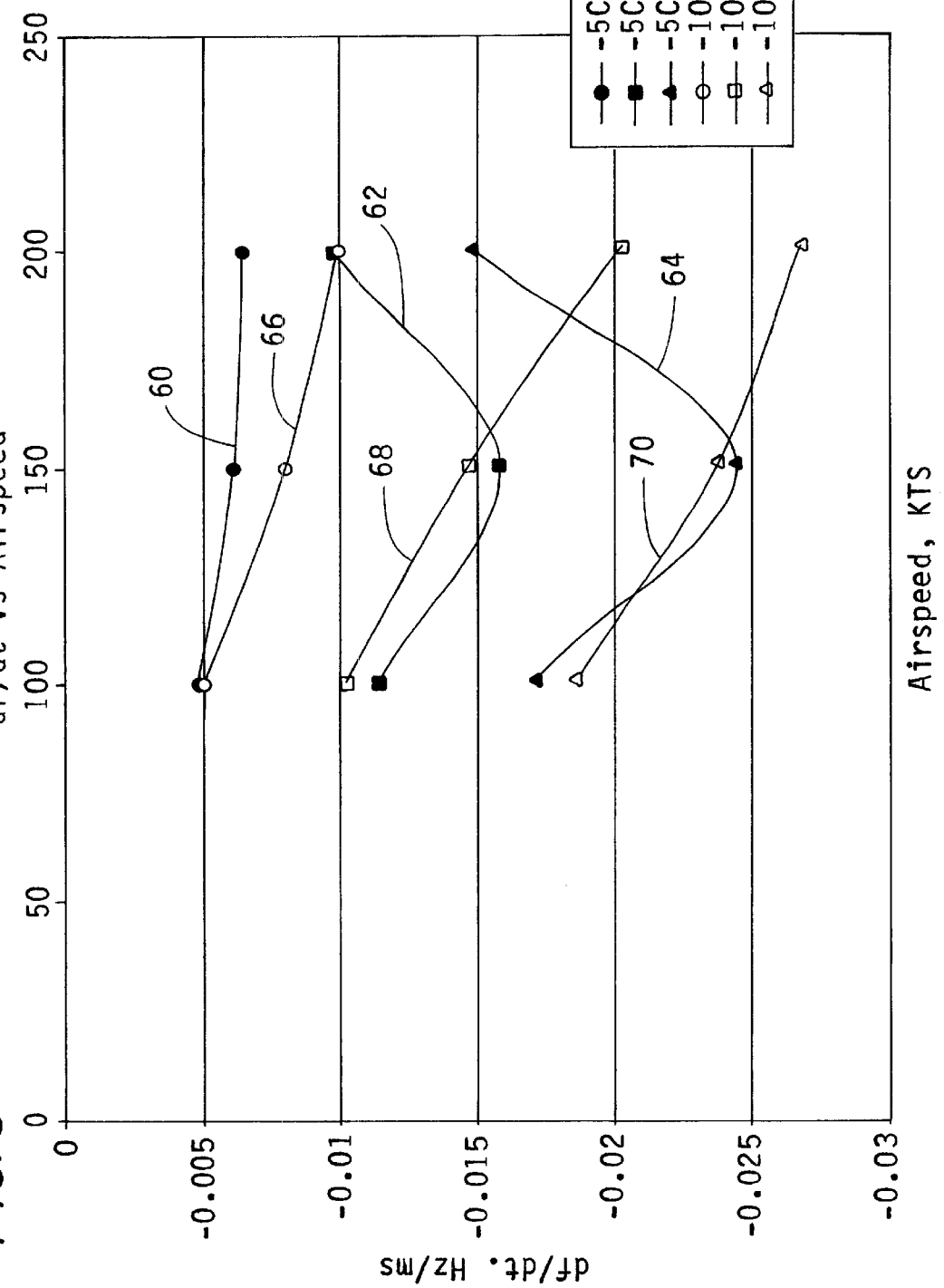
FIG. 5 is a composite plot of points derived as an average of several rate of change of frequency values (df/dt) of a test probe as a function of liquid water content at different air speeds and temperatures.

FIG. 5 is a plot of df/dt averaged data points for different airspeeds to show that there are distinct indications of liquid water content at different air speeds, different liquid water content amounts, and different temperatures such that liquid water content can be determined reliably.

The points on the plot are derived from an average of approximately 20 data point readings near the ends of the plots for corresponding liquid water content shown in FIGS. 2, 3 and 4, as well as similar data points taken at different airspeeds and temperatures as listed in FIG. 5. For example, at a temperature of −5° C., three plots are provided for liquid water contents of 0.3, 0.75 and 1.2 g/m$^3$. Each of these conditions of temperature and known liquid water content were used to determine df/dt of a vibrating probe at airflows of 100, 150 and 200 knots.

The plot shown at 60 is with 0.30 g/m$^3$ of liquid water at −5° C., and at 100, 150 and 200 knots. The change in rate of change of frequency (df/dt) does not show wide swings, but shows definitive changes between the air flows to indicate liquid water content at particular air speeds and temperature based upon the rate of change of frequency.

Plot 62 represents data points for df/dt at −5° C. and 0.75 g/m$^3$ liquid water content, and shows greater changes between the listed air speeds.

The plot 64 is for −5° C. with a liquid water content of 1.2 g/m$^3$. Again, the rate of change of frequency provides a distinctive signal at each of the various air speeds to permit direct indication of liquid water content.

At −10° C., the 0.3 g/m$^3$ liquid water content measuring df/dt results in a plot 66; the 0.75 g/m$^3$ liquid water content results in a plot 68, and the 1.2 g/m$^3$ liquid water content provides a plot 70. Again, the individual points shown for the plots 60, 62, 64, 66, 68 and 70 are averages of df/dt of data points taken shortly before the heater is turned on, or near the right hand end of the plots of data points shown in FIGS. 2, 3 and 4.

In aggregate, the plots of FIG. 5 show that definitive points are established at each air speed, temperature, and df/dt condition, so that upon determining the rate of change of frequency after a selected time from the start of ice accretion, the liquid water content at a particular temperature and a particular air speed can be determined by a lookup table or by an algorithm. The look up table values can be extrapolated for different airspeeds and temperatures, so knowing df/dt the liquid water content can be determined. Also df/dt can give the desired information on when to turn on the heaters.

The present invention thus uses readily available information for providing the liquid water content of airflow past a vibrating type probe such as an ice detector probe. The determination of the rate of change of frequency is a straight forward computation based upon the change in frequency across a time measurement. The discovery that the rate of change of frequency of a vibrating type ice detector probe provides reliable indications of liquid water content at substantially all useful ranges of such liquid water content in ambient air permits enhanced operation of air vehicles in particular, insofar as deicing equipment is concerned, and enhances the ability to makes liquid water content measurements of reasonable quality for research purposes.

The indication of liquid water content is reliably obtained, even when the liquid water content is above the Ludlam Limit.

Although the present invention has been described with reference to preferred embodiments, workers skilled in the art will recognize that changes may be made in form and detail without departing from the spirit and scope of the invention.

What is claimed is:

1. An apparatus for determining the liquid water content in air flowing past an aircraft comprising a vibrating ice detector probe mounted on the aircraft and excitable to vibrate at a resonant frequency which changes as ice accretion occurs, a frequency determination circuit for determining the frequency of vibration of the ice detector probe, and for calculating rate of change of such frequency, including a processor, an input to the processor indicating airspeed, and an input to the processor indicating air temperature, the processor correlating parameters comprising the rate of change of frequency, and air velocity and air temperature inputs to previously established relationships between these parameters characterized by one of a lookup table and algorithm in the processor to provide an output indicating liquid water content.

2. The apparatus of claim 1 including probe deicing heaters connected to receive the output for activating the probe deicing heaters at selected times.

3. A method of determining liquid water content in an airflow, for signaling icing conditions for an air vehicle, including providing a vibrating ice detector probe on the aircraft, determining frequency changes indicating ice accretion on the ice detector probe, determining the rate of change of frequency of the ice detector probe as ice accretes, determining airspeed of the air vehicle, determining air temperature of the airflow and combining parameters comprising the airspeed, air temperature and the rate of change of frequency for correlation to previously established relationships between these parameters characterized by one of a lookup table and algorithm in the processor for providing an output indicating liquid water content of the air.

4. The method of claim 3 including the step of initiating heaters on the ice detecting probe after a selected time.

5. The method of claim 4 including the step of initiating ice protection systems on the air vehicle on which the probe is mounted.

6. The method of claim 3 including providing aircraft configuration constants to the processor.

7. The method of claim 3, and further comprising performing at least one cycle of:

heating the probe, and repeating the steps of determining frequency changes, the temperature, and the airspeed, and performing the operation producing an output indicating liquid water content of the airflow.

8. An apparatus for determining liquid water content in a body of air, comprising a probe system comprising a probe, configured to vibrate at a frequency that changes as ice accretes on the probe from supercooled water in a body of air; a logic device, communicatively connected to the probe system, configured to accept inputs from the probe system and provide a parameter indicating a rate of change of frequency of vibration of the probe, the logic device connected to receive additional input parameters representing a temperature of the body of air and a relative velocity of the body of air past the probe system, and the logic device including a set of stored data based on previously established relationships between the parameters as the parameters change to determine liquid water content in the body of air; and a heating device, communicatively connected to the logic device, and configured for heating the probe sufficiently, when activated by an output from the logic device, to diminish ice accreted on the probe.

9. The apparatus of claim 8, wherein the logic device includes circuitry to perform at least one cycle of temporarily activating the heating device to heat the probe, and then to measure the rate of change of frequency of the probe after the heating device has been deactivated.

10. An apparatus for determining liquid water content in a body of air, comprising a probe, configured to vibrate at a frequency that changes predictably as a function of a quantity of ice accreted on the probe from an amount of supercooled water in a body of air; a probe sensing circuit, configured to measure the frequency at which the probe vibrates; a logic device, communicatively connected to the probe sensing circuit and configured to accept inputs of frequency of vibration, temperature of the body of air and relative airspeed past the probe, the logic device, performing operations on the inputs, and producing outputs based on the operations; a memory storage device, communicatively connected to the logic device, configured to supply stored data as input to the logic device, including stored data representing measurements of liquid water content under known conditions of rate of change of frequency, temperature of the body of air and relative airspeed past the probe, and the logic device correlating the rate of change of frequency, the temperature of the body of air and the relative airspeed past the probe with the stored data.

11. The apparatus of claim 10, wherein there is a heating device on the probe controlled by the logic device, the logic device configured to perform at least one cycle of temporarily activating the heating device to heat the probe, then measuring the rate of change of frequency of the probe after the heating device has been deactivated, and correlating the measured rate of change of frequency after heating with the other inputs.

12. The apparatus of claim 10, wherein the set of stored data comprises data on previous tests of the probe system under controlled conditions, configured to serve as a basis for comparison with new inputs.

* * * * *